(No Model.)
F. T. COOK.
PAIL HOLDING DEVICE FOR MILKING PURPOSES.
No. 329,889. Patented Nov. 10, 1885.
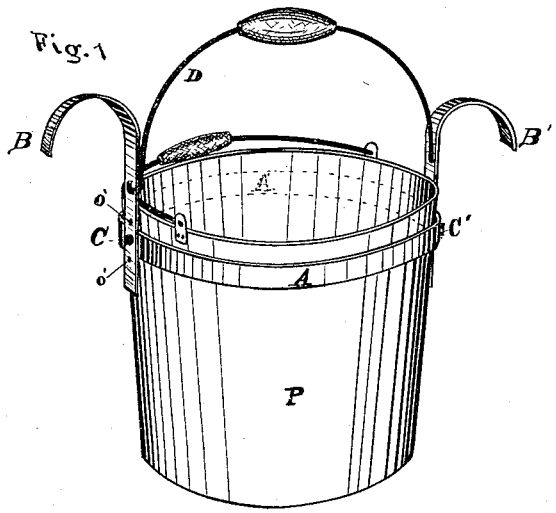
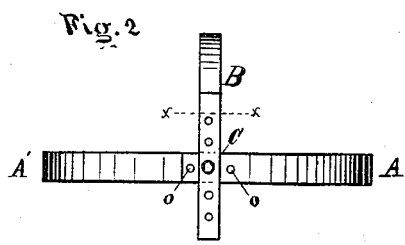
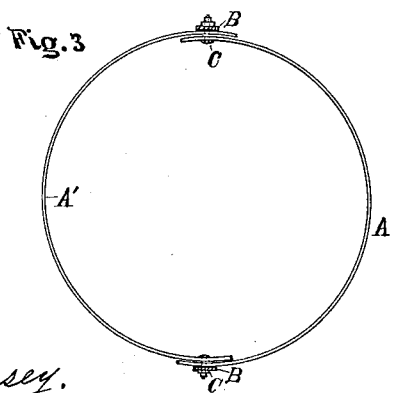
WITNESSES:
George L. Hersey.
P. H. Casey
Frank T. Cook
INVENTOR
BY
ATTORNEY

UNITED STATES PATENT OFFICE.

FRANK T. COOK, OF WEST SPRINGFIELD, MASSACHUSETTS.

PAIL-HOLDING DEVICE FOR MILKING PURPOSES.

SPECIFICATION forming part of Letters Patent No. 329,889, dated November 10, 1885.

Application filed March 11, 1885. Serial No. 158,444. (No model.)

*To all whom it may concern:*

Be it known that I, FRANK T. COOK, a citizen of the United States, residing at West Springfield, in the county of Hampden and State of Massachusetts, have invented a new and useful Improvement in Pail-Holding Devices for Milking Purposes, of which the following is a specification.

The object of my invention is to provide a practical and simple means of suspending a pail, while a cow is being milked, in such a manner that the pail shall be clear from the dirt and inequalities of the ground, and at the same time be in a convenient position for receiving the milk as it comes from the udder.

My invention consists of a sectional hoop, adjustable by means of perforations to pails of various sizes, provided with vertically-adjustable hooks, loosely bolted to said hoop and adapted to rest upon the legs of the milker; also, in the arrangement, with the above, of a bail attached to said hooks for convenience in lifting and carrying the pail.

In the accompanying drawings, Figure 1 is a perspective view of the device with a pail inclosed. Fig. 2 is a side elevation of the same. Fig. 3 is a horizontal section.

In Figs. 1 and 3 is shown a hoop composed of the sections A and A', adapted to embrace and securely hold a pail, P. These sections, near the ends, and at convenient distances apart, are provided with a series of perforations, *o*, Fig. 2, through which may pass bolts *c* and *c'*. By bringing different holes in the respective sections to coincide, the circumference of the hoop may be changed so as to fit pails of different size. To said hoop are attached hooks B and B', Fig. 1, adapted to engage or "hook over" the legs of the milker, above and near the knee, and thereby hold the weight of the pail suspended. These hooks are also provided with a series of perforations, *o'*, near the straight ends, through one or another of which pass bolts *c* and *c'*. By shifting the bolt from one hole to another the height of the pail may be varied. These hooks and the hoop are preferably made of galvanized sheet metal. When not in use, the sections of the hoop may be folded together, so as to occupy but little space.

In addition to the device as above described, is bail D, Fig. 1, similar to those in common use on pails. The bail is hooked through perforations in the extensions B and B', as shown, and is detachable at the option of the user.

Having now fully described my invention, what I claim, and desire to secure by Letters Patent, is—

1. A pail-holding device consisting of a hoop composed of sections A and A', provided with perforations *o* for circumferential adjustment, and hooks B and B', provided with perforations *o'* for vertical adjustment, the sections and hooks being joined together by means of bolts *c* and *c'*, substantially as described.

2. A pail-holding device consisting of an adjustable hoop composed of perforated sections A and A', perforated hooks B and B', joined thereto by means of bolts *c* and *c'*, and provided with bail D, hooked to parts B and B', substantially as described.

FRANK T. COOK.

Witnesses:
J. N. BAGG,
P. H. CASY.